(12) United States Patent
Shioiri et al.

(10) Patent No.: US 9,815,362 B2
(45) Date of Patent: Nov. 14, 2017

(54) CONTROL SYSTEM FOR HYBRID VEHICLE

(71) Applicant: TOYOTA JIDOSHA KABUSHIKI KAISHA, Toyota-shi (JP)

(72) Inventors: Hiroyuki Shioiri, Yokohama (JP); Hideaki Komada, Gotemba (JP); Yuki Kurosaki, Susono (JP); Hiroyuki Shibata, Odawara (JP); Hiroki Yasui, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/137,491

(22) Filed: Apr. 25, 2016

(65) Prior Publication Data

US 2016/0339775 A1    Nov. 24, 2016

(30) Foreign Application Priority Data

May 20, 2015    (JP) .................................. 2015-102452

(51) Int. Cl.

| | |
|---|---|
| *F16D 21/00* | (2006.01) |
| *F16D 39/00* | (2006.01) |
| *F16D 43/00* | (2006.01) |
| *F16H 57/04* | (2010.01) |
| *B60K 6/383* | (2007.10) |
| *B60K 6/26* | (2007.10) |
| *B60K 6/365* | (2007.10) |
| *B60K 6/445* | (2007.10) |
| *F16D 41/12* | (2006.01) |
| *F16D 41/14* | (2006.01) |
| *F16D 27/10* | (2006.01) |

(52) U.S. Cl.
CPC ................ *B60K 6/383* (2013.01); *B60K 6/26* (2013.01); *B60K 6/365* (2013.01); *B60K 6/445* (2013.01); *F16D 41/125* (2013.01); *F16D 41/14* (2013.01); *B60Y 2200/92* (2013.01); *B60Y 2306/03* (2013.01); *F16D 27/10* (2013.01); *F16D 2300/06* (2013.01); *Y10S 903/906* (2013.01); *Y10S 903/91* (2013.01); *Y10S 903/913* (2013.01)

(58) Field of Classification Search
CPC .................. F16D 2300/06; B60Y 2306/03
See application file for complete search history.

(56) References Cited

U.S. PATENT DOCUMENTS

| | | | | |
|---|---|---|---|---|
| 6,035,988 | A | * | 3/2000 | Ito ..................... B60K 17/3505 180/247 |
| 2014/0358349 | A1 | * | 12/2014 | Okuda .................. B60K 6/445 701/22 |
| 2015/0314769 | A1 | * | 11/2015 | Okuda .................. F16H 61/686 477/5 |

FOREIGN PATENT DOCUMENTS

| | | |
|---|---|---|
| JP | 2008-267866 | 11/2008 |
| JP | 5120650 | 1/2013 |

(Continued)

*Primary Examiner* — Tisha Lewis
(74) *Attorney, Agent, or Firm* — Oblon, McClelland, Maier & Neustadt, L.L.P.

(57) ABSTRACT

A control system for a hybrid vehicle configured to prevent an undesirable engagement of the selectable one-way clutch is provided. In order to reduce a drag torque resulting from a cranking of an engine to bring the selectable one-way clutch into engagement mode, the control system raises a temperature of lubrication oil before carrying out the cranking of the engine if it is too low, and carries out the cranking of an engine by a motor after the temperature of the lubrication oil is raised to a level at which viscosity thereof is reduced.

8 Claims, 13 Drawing Sheets

(56) References Cited

FOREIGN PATENT DOCUMENTS

| JP | 2013-86585 | 5/2013 | | |
|---|---|---|---|---|
| JP | 5380381 B2 * | 1/2014 | ............. | F16H 61/02 |

* cited by examiner

CONTROL SYSTEM FOR HYBRID VEHICLE

CROSS REFERENCE TO RELATED APPLICATIONS

The present invention claims the benefit of Japanese Patent Application No. 2015-102452 filed on May 20, 2015 with the Japanese Patent Office, the disclosures of which are incorporated herein by reference in its entirety.

BACKGROUND

Field of the Invention

Embodiments of the present application relates to the art of a control system for a hybrid vehicle having a selectable one-way clutch that halts a rotation of a predetermined rotary member.

Discussion of the Related Art

Japanese Patent Publication No. 5120650 describes a hybrid vehicle having a clutch selectively providing a connection between an engine and a planetary gear unit serving as a power distribution device, and a brake selectively halting a rotation of an input shaft connected to the engine. According to the teachings of Japanese Patent Publication No. 5120650, in the planetary gear unit, a first rotary element is connected to the input shaft, a second rotary element is connected to a first motor-generator, and a third rotary element serves as an output element. A second motor-generator is disposed on a power transmission route between the output element and drive wheels. The hybrid vehicle taught by Japanese Patent Publication No. 5120650 can be powered by the first motor-generator and the second motor-generator by supplying electric power to those motor-generators while releasing the clutch and halting the input shaft by the brake. In this situation, when restarting the engine, the engine is started by the first motor-generator while releasing the brake and connecting the input shaft to the engine through the clutch.

JP-A-2008-267866 describes a viscosity detection apparatus that detects viscosity of lubricant based on a rotational resistance of an impeller at a site where a viscosity sensor is installed. JP-A-2013-086585 describes a drag torque acting between an inner clutch plate and an outer clutch plate of a drive force transmission device through lubricant.

An operating mode of the conventional selectable one-way clutch is switched between an engagement mode in which the selectable one-way clutch is enabled to transmit torque in one direction, and an overrunning mode in which the selectable one-way clutch is not allowed to transmit torque in both directions. The conventional selectable one-way clutch is comprised of a pocket plate having a plurality of struts, a notch plate having a plurality of notches individually engaged with the struts, and a selector plate having a plurality of apertures for letting though the struts. The pocket plate and the notch plate are axially opposed to each other, and the selector plate is interposed between the pocket plate and the notch plate while being allowed to rotate relatively therewith. The brake taught by Japanese Patent Publication No. 5120650 is adapted to selectively halt a forward rotation of the input shaft. To this end, the selectable one-way clutch may be used in the hybrid vehicle taught by Japanese Patent Publication No. 5120650 instead of the brake.

In order to reduce friction between the strut and the selector plate or the notch plate and friction between those plates, lubrication oil is applied to the selectable one-way clutch. However, a drag torque is generated between the plates depending on viscosity of the oil. Specifically, viscosity of oil is increased with a reduction in a temperature thereof, and such drag torque is increased with an increase in the viscosity. As described, the selectable one-way clutch may be used in a hybrid vehicle to selectively halt a rotation of the input shaft or the engine connected thereto. However, if the oil viscosity is high, the selector plate may be rotated unintentionally when allowing the input shat or the engine to rotate by a drag torque resulting from a rotation of the input shaft or the engine, and consequently, the selectable one-way clutch may be brought into engagement unnecessarily. If the selectable one-way clutch is thus brought into engagement undesirably when restarting the engine, the engine cannot be rotated by the motor.

SUMMARY

Aspects of embodiments of the present application have been conceived noting the foregoing technical problems, and it is therefore an object of embodiments of the present invention is to provide a control system for a hybrid vehicle configured to prevent an undesirable engagement of the selectable one-way clutch even if viscosity of oil is high.

The control system for a hybrid vehicle is applied to a hybrid vehicle comprising: an engine; at least one motor; a rotary member that is rotated in a predetermined direction during propulsion of the vehicle by a driving force generated by the engine and during cranking the engine by the motor; and a selectable one-way clutch that inhibits the rotary member from rotating in the predetermined direction in an engagement mode, and that allows the rotary member to rotate in the predetermined direction in an overrunning mode. In order to achieve the above-explained objective, according to the preferred embodiment of the present application, the selectable one-way clutch is provided with a fixed member, a movable member that is connected to the rotary member, and a selector member that is disposed between the fixed member and the movable member and that is rotated in the predetermined direction to bring the selectable one-way clutch into the engagement mode by engaging the movable member with the fixed member. In addition, the control system is configured to raise a temperature of lubrication oil when cranking the engine by the motor, and to rotate the rotary member in the predetermined direction by cranking the engine by the motor after raising the temperature of the lubrication oil while bringing the selectable one-way clutch into the overrunning mode.

In a non-limiting embodiment, the control system may be further configured to determine the temperature of the lubrication oil applied to the selectable one-way clutch when cranking the engine by the motor, and to raise the temperature of the lubrication oil if it determines that the temperature of the lubrication oil is low.

In a non-limiting embodiment, the selectable one-way clutch may further comprises an actuator that rotates the selector member from a position at which the selectable one-way clutch is brought into the overrunning mode to a position at which the selectable one-way clutch is brought into the engagement mode. In addition, the control system may be further configured to determine that the temperature of the lubrication oil is low, based on a fact that a stroke time of the actuator over a predetermined distance or a rotational time of the selector member at a predetermined rotational angle while applying a constant activation force to the actuator is longer than a reference period of time.

In a non-limiting embodiment, the control system may be further configured to determine that the temperature of the lubrication oil is low, based on a fact that a stroke distance of the actuator or a rotational angle of the selector member while applying a constant activation force to the actuator within a predetermined period of time is shorter than or narrower than a reference distance or angle.

In a non-limiting embodiment, the control system may be further configured to determine that the temperature of the lubrication oil is low, based on a fact that the activation force applied to the actuator to rotate the selector member at a predetermined angle is greater than a reference value.

In a non-limiting embodiment, the control system may be further configured to determine that the temperature of the lubrication oil is low, based on a fact that a rotational angle of the selector member rotated by a drag torque resulting from a rotation of the movable member is wider than a reference angle.

In a non-limiting embodiment, the control system may be further configured to raise the temperature of the lubrication oil by rotating the movable member in an opposite direction to the predetermined direction.

In a non-limiting embodiment, the control system may be further configured to raise the temperature of the lubrication oil by reciprocating the selector member between the position at which the selectable one-way clutch is brought into the engagement mode and the position at which the selectable one-way clutch is brought into the overrunning mode.

In the hybrid vehicle to which the control system according to the preferred embodiment of the present application is applied, the rotary member is rotated in the predetermined direction during cranking the engine by the motor. In this situation, the selector member is subjected to a drag torque through the lubrication oil in a direction from the position at which the selectable one-way clutch is brought into the overrunning mode to the position at which the selectable one-way clutch is brought into the engagement mode. During execution of the cranking of the engine, the control system according to the preferred embodiment raises a temperature of the lubrication oil if it determines that the temperature of the lubrication oil is low. According to the preferred embodiment, therefore, viscosity of the lubrication oil can be reduced to damp the drag torque acting on the selector member during execution of the cranking of the engine in the direction toward the position at which the selectable one-way clutch is brought into the engagement mode. For this reason, the engine can be started without rotating the selector member undesirably to the position at which the selectable one-way clutch is brought into the engagement mode.

In addition to the above-explained advantage, according to the preferred embodiment of the present application, the low temperature of the lubrication oil can be determined by a simple procedure based on e.g., the stroke time of the actuator to rotate the selector member at the predetermined rotational angle, or the rotational angle of the selector member rotated by the drag torque resulting from a rotation of the movable member.

Further, according to the preferred embodiment of the present application, the temperature of the lubrication oil can be raised easily by applying a shearing force to the lubrication oil.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 15:
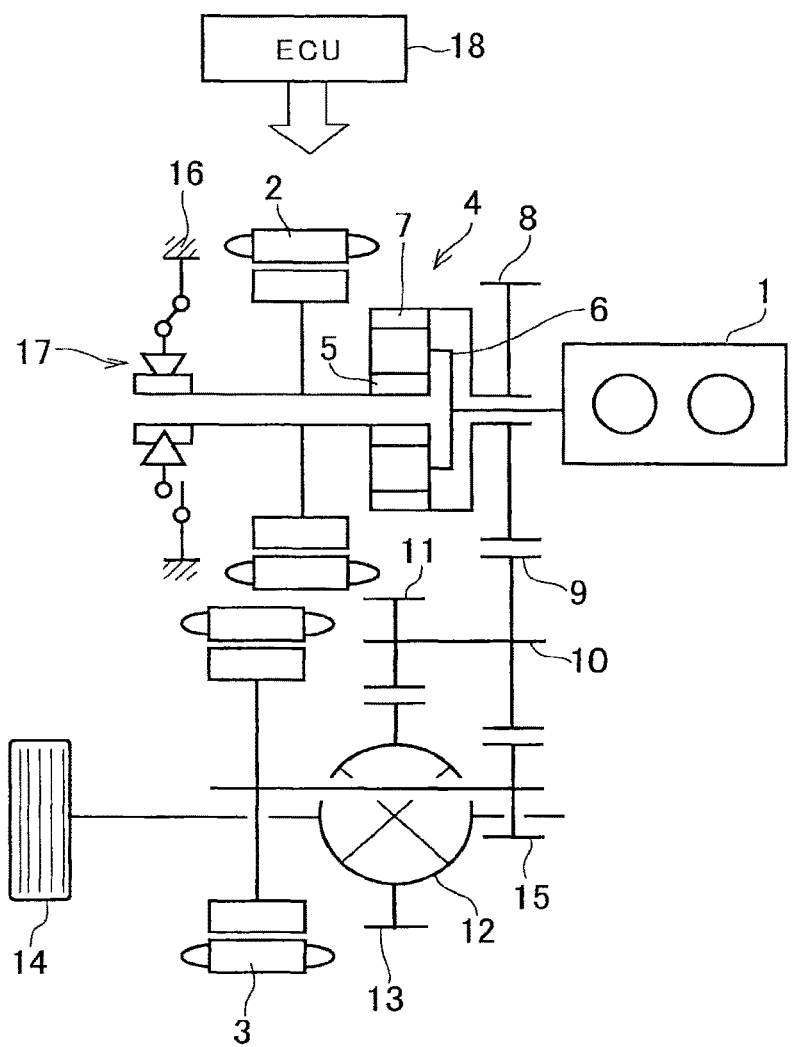
FIG. 15 is a skeleton diagram showing one example of a powertrain of the hybrid vehicle to which the control system according to the preferred example is applied.

Preferred embodiments of the present application will now be explained with reference to the accompanying drawings. The control system according to the preferred embodiment is applied to a hybrid vehicle having an engine and at least one motor, and the motor may also be used as a starter of the engine. Referring now to FIG. 15, there is shown one example of a two-motor type hybrid vehicle to which the control system is applied. As shown in FIG. 15, a prime mover of the hybrid vehicle includes an engine (referred to as "ENG" in FIG. 15) 1, a first motor 2 (referred to as "MG1" in FIG. 15) and a second motor 3 (referred to as "MG2" in FIG. 15), and both of the first motor 2 and the second motor 3 may also serve as generators. The first motor 2 is mainly used to control a speed of the engine 1 and to carry out a cranking of the engine 1. To this end, the first motor 2 is connected to the engine 1 through a power distribution device 4 as a differential unit.

According to the example shown in FIG. 15, a single-pinion planetary gear unit adapted to perform a differential action among three rotary elements is used as the power distribution device 4. In the power distribution device 4, specifically, a sun gear 5 is connected to a rotor of the first motor 2, a carrier 6 is connected to an output shaft (i.e., a crankshaft) of the engine 1 and a ring gear 7 serves as an output element. An output gear 8 as an output member is connected to the ring gear 7 while meshing with a counter driven gear 9 fitted onto one end of a counter shaft 10. A counter drive gear 11 that is diametrically smaller than the counter driven gear 9 is fitted onto the other end of the counter shaft 10 while meshing with a ring gear 13 of a differential unit 12. A drive torque delivered to the differential unit 12 is distributed to each drive wheel 14.

The second motor 3 is mainly used as a motor to propel the vehicle. To this end, a drive gear 15 fitted onto a rotor shaft is meshed with the counter driven gear 9. The drive gear 15 is diametrically smaller than the counter driven gear 9 so that the drive gear 15 serves as a speed reducing device together with the counter driven gear 9.

A selectable one-way clutch (to be abbreviated as the "SOWC" hereinafter) 17 is disposed between the sun gear 5 connected to the first motor 2 and a casing 16 as a stationary member. An operating mode of the SOWC 17 may be switched between an overrunning mode in which the selectable one-way clutch is allowed to rotate relatively in both directions without transmitting torque, and an engagement mode in which the selectable one-way clutch is inhibited to rotate relatively in one direction but allowed to rotate in the opposite direction to transmit torque. In the following description, a rotational direction of the engine 1 will be called the "forward direction", and the rotational direction opposite to the rotational direction of the engine 1 (i.e., an inverse rotation) will be called the "backward direction". A structure of the SOWC 17 will be explained later in more detail.

The first motor 2 and the second motor 3 are individually connected to a battery and a control device such as an inverter (both not shown) to transfer electric power therebetween. In order to control the battery, the inverter, the SOWC 17 and so on, the hybrid vehicle is provided with an electronic control unit (abbreviated as the "ECU" hereinafter) 18 as a controller composed mainly of a microcomputer. For example, detection signals of a vehicle speed, an opening degree of an accelerator, a speed and an output torque of the engine 1, torques of the motors 2 and 3, an operating mode of the SOWC 17 and so on are sent to the ECU 18. The ECU 18 carries out a calculation based on the incident data, and transmits a calculation result to the engine 1, the motors 2 and 3, the SOWC 17 and so on in the form of command signal.

Figure 16:
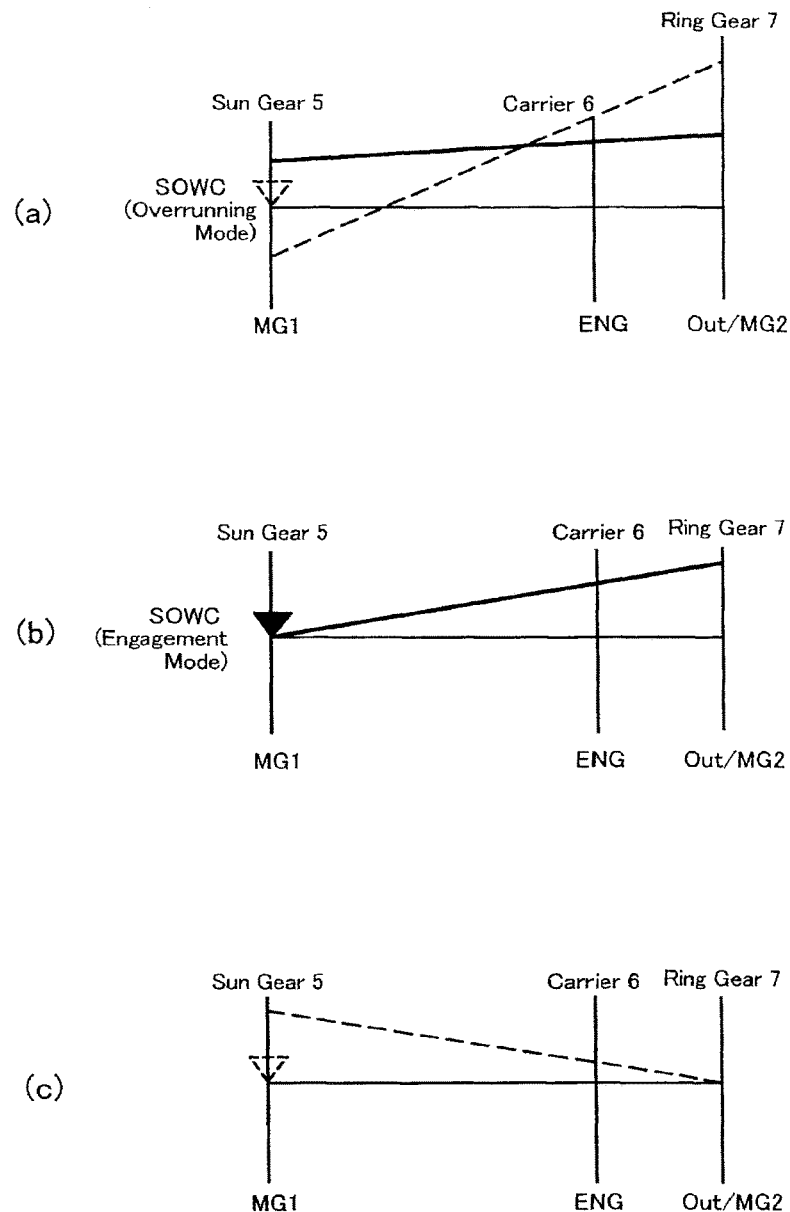
FIG. 16 is a nomographic diagram of the planetary gear unit serving as a power distribution device of the hybrid vehicle shown in FIG. 15.

Turning to FIG. 16, there is shown a nomographic diagram of the power distribution device 4. Specifically, FIG. 16 (a) shows a situation during propulsion of the vehicle in the forward direction under the hybrid mode (also called as the "HV mode" and the "power split mode"). In this situation, the engine 1 is driven and both of the carrier 6 and the ring gear 7 are rotated in the forward direction. The SOWC 17 is in the overrunning mode so that the sun gear 5 and the first motor 2 connected thereto are allowed to rotate in both directions. In the situation shown in FIG. 16 (a), specifically, the first motor 2 is rotated in the forward direction to serve as a generator. That is, the first motor 2 establishes a negative torque (downwardly in FIG. 16 (a)) to control the rotational speed of the engine 1 in an optimally fuel efficient manner. An electric power generated by the first motor 2 is supplied to the second motor 3 so that the second motor 3 generates a driving force to propel the vehicle.

FIG. 16 (b) shows a situation during propulsion of the vehicle in the forward direction under the parallel mode in which the vehicle is powered by the engine 1 or by the engine 1 and the second motor 2 while restricting a forward rotation of the sun gear 5 by the SOWC 17. In this situation, the ring gear 7 is rotated at a speed higher than the rotational speed of the engine 1 (or the carrier 6) to deliver torque to the drive wheels 14 through the differential unit 12, and an output torque of the second motor 3 can be added to the torque delivered to the drive wheels 14. In this case, the first motor 2 is halted together with the sun gear 5 while stopping a power supply thereto so that the fuel efficiency at high speed range can be improved.

FIG. 16 (c) shows a situation during starting the engine 1 in the stopping vehicle. When the hybrid vehicle is stopped, the sun gear 5, the carrier 6 and the ring gear 7 are not rotated, and if the brake or parking lock is applied, the ring gear 7 is halted. In this situation, if the sun gear 5 is rotated in the forward direction by the first motor 2, the torque rotating the carrier 6 in the forward direction is applied to the crankshaft of the engine 1. In FIG. 16 (c), a situation during execution of the cranking of the engine 1 is indicated by a dashed line. In the example shown in FIG. 15, accordingly, the first motor 2 serves as the "motor", and the sun gear 6 serves as the "rotary member".

Figure 17:
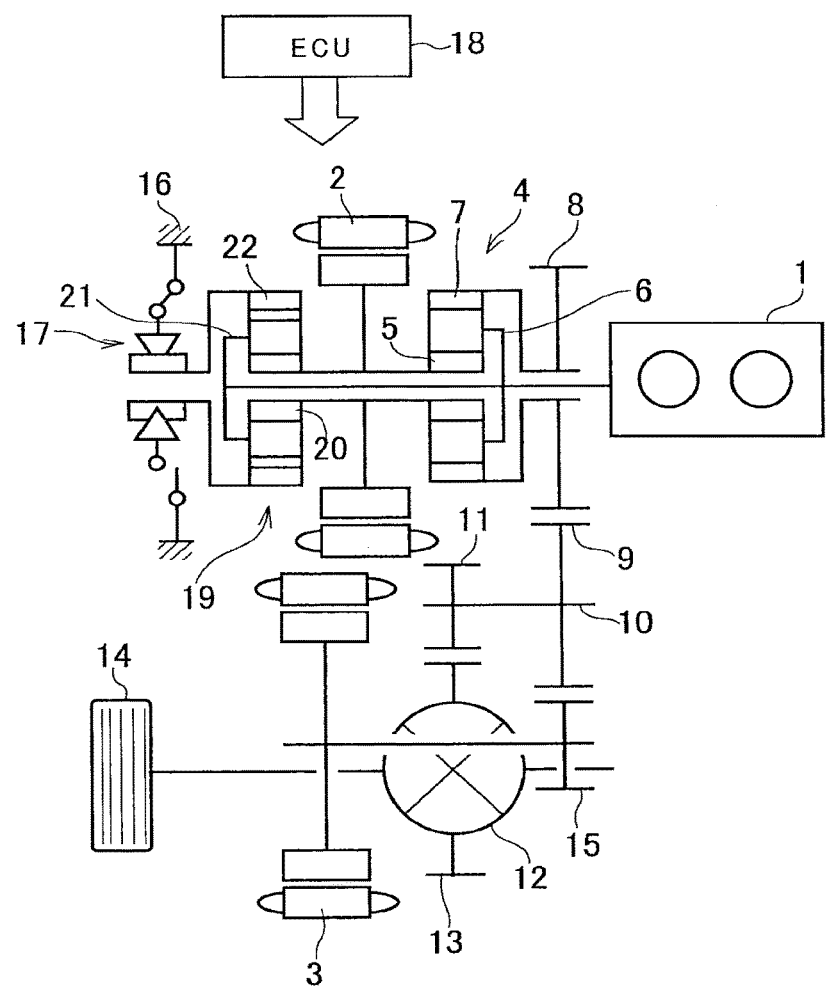
FIG. 17 is a skeleton diagram showing another example of a powertrain of the hybrid vehicle to which the control system according to the preferred example is applied.

Turning to FIG. 17, there is shown another example of the hybrid vehicle to which the control system is applied. According to the example shown in FIG. 17, the hybrid vehicle is further provided with an overdrive device (O/D) 19, and the overdrive device 19 is selectively halted by the SOWC 17. Specifically, the overdrive device 19 is a double-pinion planetary gear unit having a sun gear 20, a carrier 21, and a ring gear 22. In the overdrive device 19, the carrier 21 is connected to the carrier 6 of the power distribution device 4 so that the output torque of the engine 1 is delivered to the carrier 6 and the carrier 21. The sun gear 20 of the overdrive device 19 is connected to the sun gear 5 of the power distribution device 4 so that the output torque of the first motor 2 is delivered to the sun gear 5 and the sun gear 20. The SOWC 17 is interposed between the ring gear 22 and the casing 16 to restrict a forward rotation of the ring gear 22 thereby establishing the overdrive mode. The remaining structures are similar to those of the hybrid vehicle shown in FIG. 15, and detailed explanations for the common elements will be omitted by allotting common reference numerals thereto.

Figure 18:
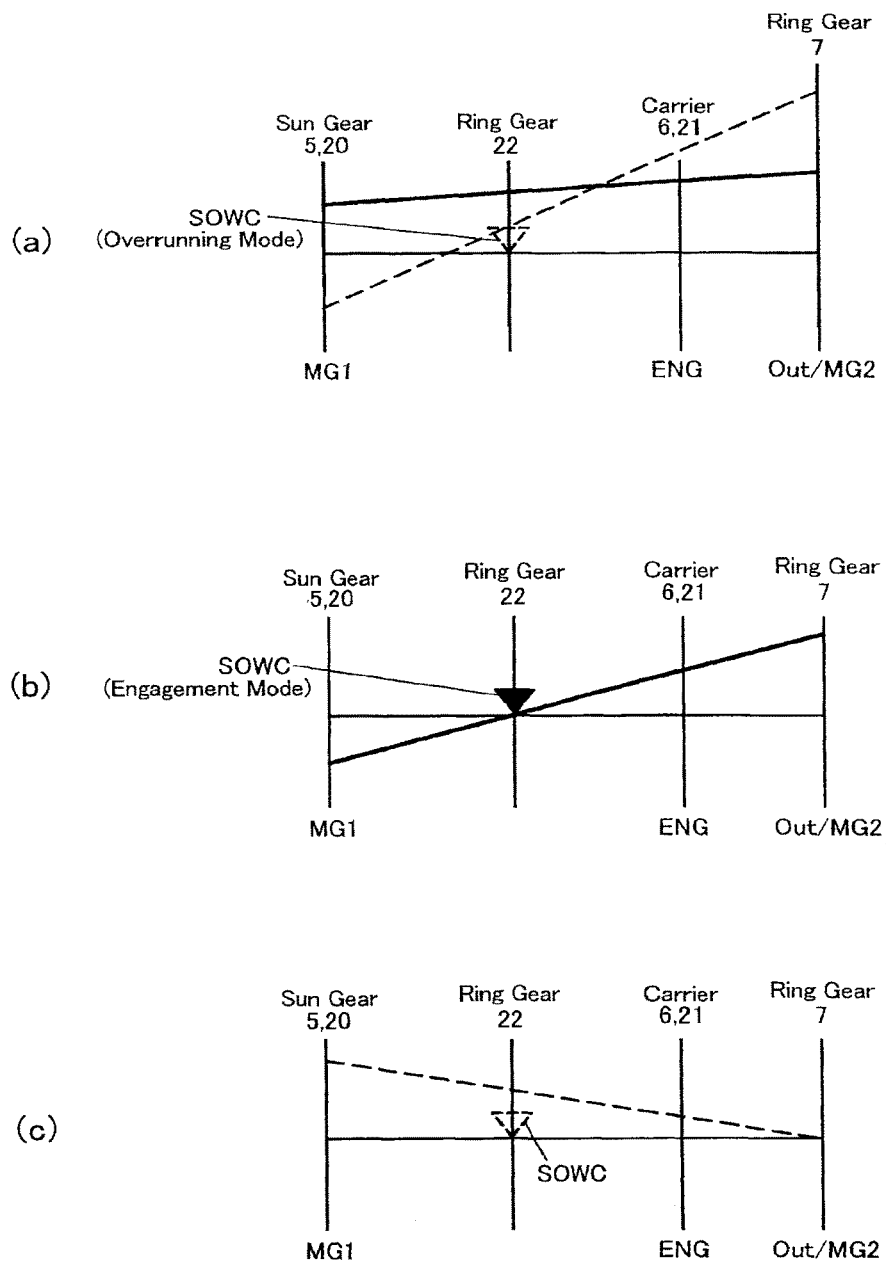
FIG. 18 is a nomographic diagram of the planetary gear units serving as a power distribution device and the overdrive device of the hybrid vehicle shown in FIG. 17.

Turning to FIG. 18, there are shown nomographic diagrams of a combined planetary gear unit formed by the power distribution device 4 and the overdrive device 19. Specifically, FIG. 18 (a) shows a situation during propulsion of the vehicle in the forward direction under the hybrid mode (i.e., the "HV mode" or the "power split mode"). In this situation, the engine 1 is driven and both of the carrier 6 and the ring gear 7 are rotated in the forward direction. The SOWC 17 is in the overrunning mode so that the sun gear 5 or the ring gear 22 and the first motor 2 connected thereto are allowed to rotate in both directions. In the situation shown in FIG. 18 (a), specifically, the first motor 2 is also rotated in the forward direction to serve as a generator. That is, the first motor 2 establishes a negative torque (downwardly in FIG. 18 (a)) to control the rotational speed of the engine 1 in an optimally fuel efficient manner. An electric power generated by the first motor 2 is supplied to the second motor 3 so that the second motor 3 generates a driving force to propel the vehicle.

FIG. 18 (b) shows a situation during propulsion of the vehicle in the forward direction by the engine 1 or by the engine 1 and the second motor 2 while restricting a forward rotation of the ring gear 22 by the SOWC 17. In this situation, in the overdrive device 19, a torque is applied to the carrier 21 in the forward direction while restricting the forward rotation of the ring gear 22 and hence the sun gear 20 is rotated in the backward direction. Meanwhile, in the power distribution device 4, the sun gear 5 is also rotated in the backward direction together with the sun gear 20 of the overdrive device 19. In this situation, since the output torque of the engine 1 is applied to the carrier 6 of the power distribution device 4 while rotating the sun gear 5 in the backward direction, the ring gear 7 as the output element is rotated at a speed higher than the rotational speed of the carrier 6 (or the engine 1) to establish the overdrive mode. The output torque of the second motor 3 may also be be added to the torque delivered to the drive wheels 14 through the differential unit 12. In the overdrive mode, since the first motor 2 is halted together with the ring gear 22 while stopping a power supply thereto, the fuel efficiency at a high speed range may also be improved.

FIG. 18 (c) shows a situation during starting the engine 1 in the stopping vehicle. When the hybrid vehicle is stopped, the sun gears 5 and 20, the carriers 6 and 21, and the ring gears 7 and 22 are not rotated, and the ring gear 7 is halted by the brake or parking lock. In this situation, if the sun gears 5 and 20 are rotated in the forward direction by the first motor 2, the torque rotating the carriers 6 and 21 in the forward direction is applied to the crankshaft of the engine 1 through the carrier 6, and the ring gear 22 is also rotated in the forward direction. In FIG. 18 (c), such situation during execution of the cranking of the engine 1 is also indicated by a dashed line. In the example shown in FIG. 17, accordingly, the first motor 2 serves as the "motor", and the ring gear 22 serves as the "rotary member".

Figure 19:
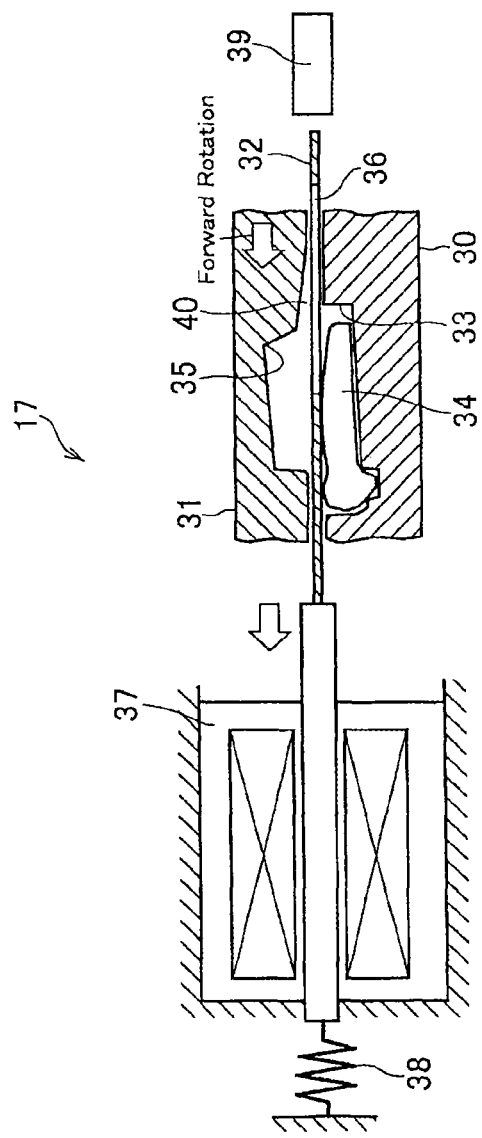
FIG. 19 is a schematic illustration showing the selectable one-way clutch.

Here will be explained a structure of the SOWC 17. For example, the SOWC taught by U.S. publication 2010/0252384 etc. may be used in the preferred embodiment. Turning to FIG. 19, there is shown an example of a structure the SOWC 17. As shown in FIG. 19, a pocket plate 30 and a notch plate 31 as disc members are coaxially opposed to each other while being allowed to rotate relatively with each other, and a selector plate 32 is interposed between the pocket plate 30 and the notch plate 31 while being allowed to reciprocate in the horizontal direction in FIG. 19. A plurality of pockets 33 are formed on a face of the pocket plate 30 facing to the notch plate 31, and a strut 37 as an engagement piece is held in each of the pocket 33 in a pivotal manner. A spring (not shown) is interposed between a leading end of the strut 34 and a bottom of the pocket 33 so that the leafing end of the strut 34 is pushed up by the spring to be brought into engagement with the notch plate 31.

On the other hand, a plurality of notches 35 as depressions are formed on a face of the notch plate 31 facing to the pocket plate 30 in the same number as the pockets 33 of the pocket plate 30. As explained later, the leading end of the strut 34 is pushed up into the notch 35 to be brought into abutment to an inner wall of the notch 35.

A plurality of apertures 36 as through holes are formed on the selector plate 32 in a same number as the pockets 33. A configuration of each of the aperture 36 is substantially identical to that of an opening of the pocket 33 of the pocket plate 30. The selector plate 32 is connected to a solenoid 37 as an actuator to be reciprocated relatively with respect to the pocket plate 30, and in order to return the selector plate 32 to a disengagement position when the solenoid is not in activation, the solenoid 37 is connected to a return spring 38. In order to determine an engagement status of the SOWC 17 based on a stroke of the selector plate 32 or the solenoid 37, the SOWC 17 is provided with a stroke sensor 39.

As described, in the example shown in FIG. 15, the pocket plate 30 is connected to the casing 16 as a stationary member, and the notch plate 31 is connected to the sun gear 5 of the power distribution device 4 or the first motor 2. On the other hand, in the example shown in FIG. 17, the pocket plate 30 is connected to the casing 16 as a stationary member, and the notch plate 31 is connected to the ring gear 22 of the overdrive device 19. Accordingly, in the preferred embodiment, the pocket plate 30 serves as the fixed member, the notch plate 31 serves as the movable member, and the selector plate 32 serves as the selector member.

Thus, in the SOWC 17, the pocket plate 30, the notch plate 31 and the selector plate 32 are allowed to rotate among each other, and the selector plate 32 is reciprocated by the solenoid 37 and the return spring 38 while being contacted to the pocket plate 30, the notch plate 31 and the strut 34. In order to lubricate contact site between those members, lubrication oil 40 is supplied to the contact site.

Specifically, FIG. 19 shows a transitional state of switching the operating mode of the SOWC 17 from the overrunning mode to the engagement mode. In this situation, the selector plate 32 is subjected to a force in the direction to compress the return spring 38 (toward the left side in FIG. 19) resulting from an actuation of the solenoid 37 or resulting from a drag torque generated by a forward rotation of the notch plate 31 through the lubrication oil 40. In the situation shown in FIG. 19, the aperture 36 of the selector plate 32 has not yet been overlapped completely with the pocket 33 of the pocket plate 30 holding the strut 34 therein, and hence the strut 34 is pushed into the pocket 33 by the selector plate 32. Specifically, the notch plate 31 is rotated in the direction toward the left side in FIG. 19. In this situation, when the selector plate 32 is further rotated toward the left side in FIG. 19 the aperture 36 of the selector plate 32 is overlapped completely with the pocket 33 of the pocket plate 30. Consequently, the leading end of the strut 34 is allowed to be pushed up to enter into the notch 35 of the notch plate 35, and brought into contact to an engagement wall of the notch 35. As a result, the pocket plate 30 is brought into engagement with the notch plate 31 through the strut 34 to enable torque transmission therebetween, that is, the SOWC 17 is brought into the engagement mode. Under the engagement mode of the SOWC 17, forward rotations of the notch plate 31 and the sun gear 5 or the ring gear 22 connected thereto are halted.

By contrast, when the notch plate 31 is rotate in the backward direction toward the right side in FIG. 19, the strut 34 is pushed into the pocket 33 of the pocket plate 30 by an opening edge of the notch 34 of the notch plate 31. Consequently, the SOWC 17 is brought into the overrunning mode so that the notch plate 31 is allowed to rotate relatively with respect to the pocket plate 30 without transmitting torque.

When a current supply to the solenoid 37 is stopped, the selector plate 32 is elastically pushed by the return spring 38 toward the right side in FIG. 19 so that the strut 34 is pushed into the pocket 33 of the pocket plate 30 by an opening edge of the aperture 36 of the selector plate 32. Consequently, the pocket plate 30 is brought into disengagement from the notch plate 31 so that the notch plate 31 is allowed to rotate in both directions relatively with respect to the pocket plate 30 without transmitting torque.

As described, the lubrication oil 40 is applied to each contact site between the pocket plate 30 and the selector plate 32, and between the selector plate 32 and the notch plate 31. Therefore, when the notch plate 31 is rotated together with the sun gear 5 and the ring gear 22 connected thereto, the selector plate 32 is subjected to a drag torque through the lubrication oil 40. Such drag torque is increased with an increase in viscosity of the lubrication oil 40 resulting from a reduction in a temperature of the lubrication oil 40. That is, if the temperature of the lubrication oil 40 is extremely low, the viscosity of the lubrication oil 40 is increased extremely to increase the drag torque excessively. In this situation, when the notch plate 31 is rotated in the forward direction, the selector plate 32 is moved by the drag torque thus increased toward the left side in FIG. 19 against the elastic force of the return spring 38. Consequently, the SOWC 17 may be brought into the engagement mode undesirably. In order to prevent such unintentional engagement of the SOWC 17, the control system according to the preferred embodiment executes the following controls.

Figure 1:
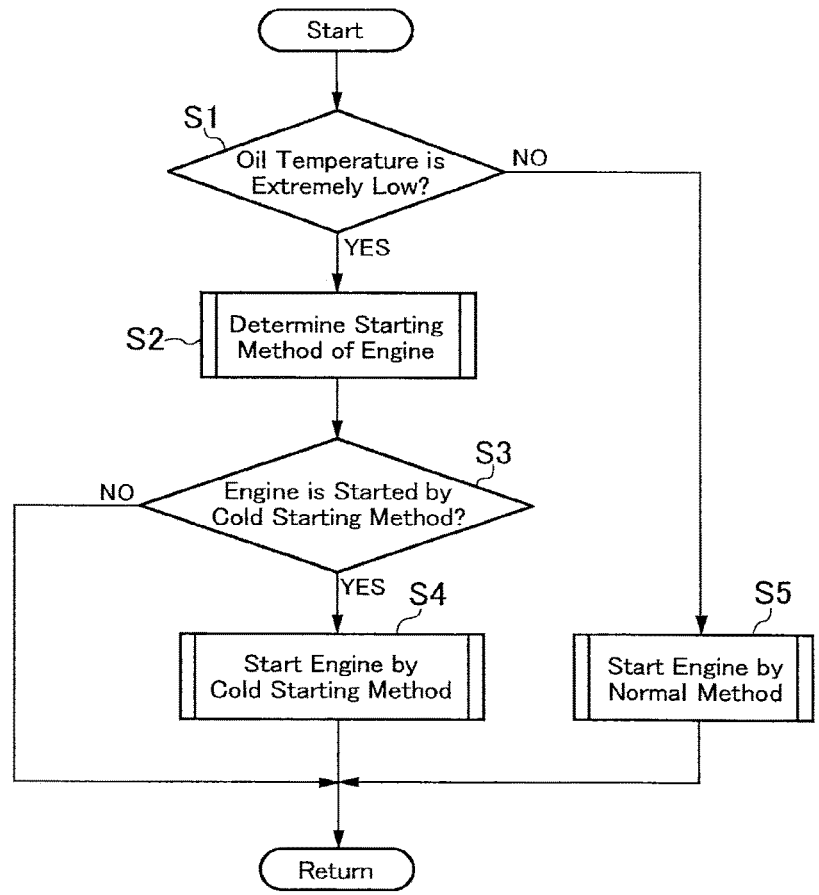
FIG. 1 is a flowchart showing one control example according to the preferred embodiment.

Turning to FIG. 1, there is shown one example of the control executed by the control system according to the preferred embodiment. Specifically, the routine shown in FIG. 1 is executed when the engine 1 is demanded to be started by the first motor 2 under a condition that the vehicle is allowed to be started (i.e., under the ready-on state). In the routine shown in FIG. 1, first of all, it is determined at step S1 whether or not the temperature of the lubrication oil 40 is extremely low.

Such determination at step S1 is carried out to determine whether or not the drag torque is increased to a magnitude possible to move (or rotate) the selector plate 32 against the elastic force of the return spring 38. To this end, the temperature of the lubrication oil 40 may be detected not only directly by a temperature sensor but also indirectly by determining an external temperature. In order to make a determination at step S1, a relation between a temperature and viscosity of the lubrication oil 40, and the temperature of the lubrication oil 40 at which the viscosity thereof is increased to a magnitude possible to move the selector plate 32 against the elastic force of the return spring 38 are determined in advance. The temperature of the lubrication oil 40 thus determined is used as a threshold of the determination at step S1, and if the temperature of the lubrication oil 40 is lower than the threshold value, the control system determines a fact that the temperature of the lubrication oil 40 is extremely low.

Figure 2:
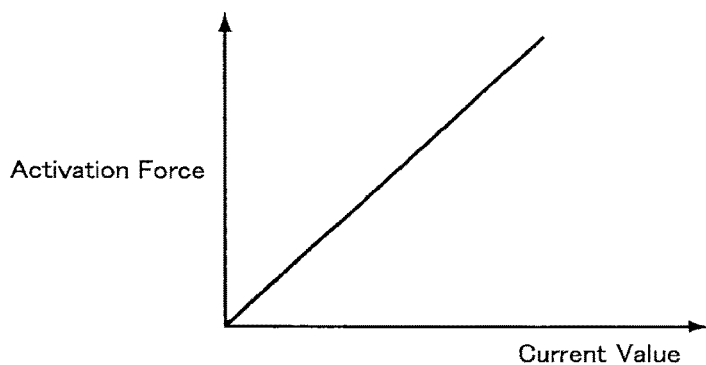
FIG. 2 is a graph schematically indicating a relation between a current and a pulling force of the solenoid.
Figure 3:
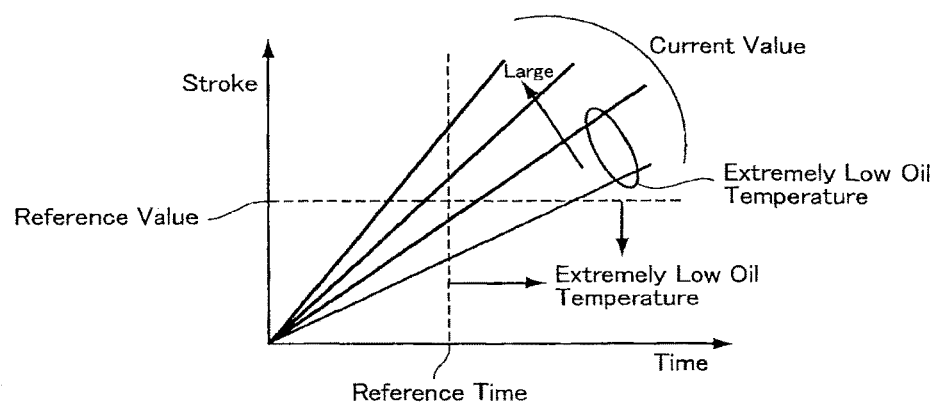
FIG. 3 is a graph schematically indicating a relation among the current value, a stroke, and a stroke time of the solenoid.

Alternatively, the determination at step S1 may also be made based on a current value applied to the solenoid 37 and a detection signal of the stroke sensor 39. A relation between an activation force of the solenoid 37 and a current value applied thereto is shown in FIG. 2. As can be seen from FIG. 2, the activation force of the solenoid 37 is increased in proportion to an increase in the current value applied thereto. This means that stroke time of the solenoid 37 to rotate the selector plate 32 at a predetermined degree is shortened, and a stroke of the solenoid 37 within a predetermined period of time, that is, a rotational angle of the selector plate 32 within the predetermined period of time is increased. A relation among the current value, the stroke amount, and time is shown in FIG. 3. As described, viscosity of the lubrication oil 40 is increased with a reduction in the temperature thereof. Consequently, a resistance against reciprocation of the solenoid 37 is increased, a stroke of the solenoid 37 within the predetermined period of time is reduced, a required time to move the solenoid 37 over a predetermined distance is increased, and a required current to move the solenoid 37 over the predetermined distance within the predetermined period of time is increased. Accordingly, the determination at step S1 is made based on above-explained relation.

Figure 4:
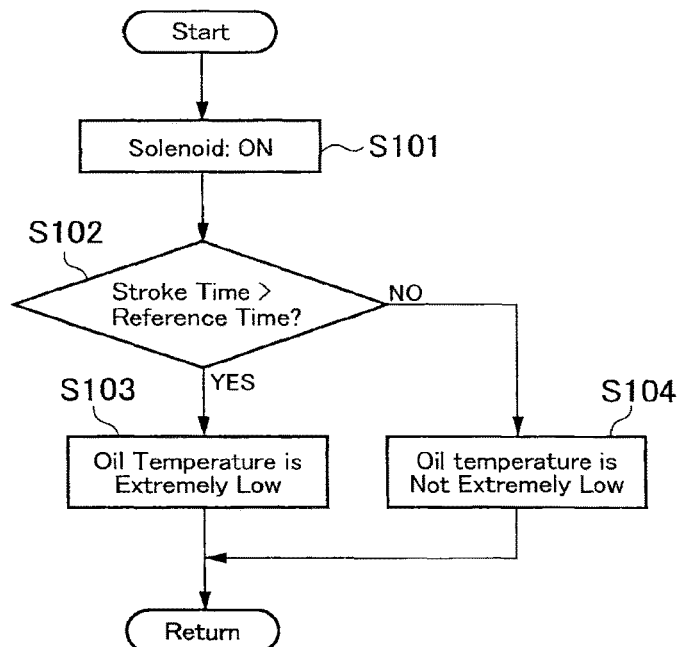
FIG. 4 is a flowchart showing a first example of a subroutine to determine an extremely low oil temperature.

Turning to FIG. 4, there is shown a first example of a subroutine to determine an extremely low temperature of the lubrication oil 40 based on a response time of a stroke of the solenoid 37. According to the subroutine shown in FIG. 4, at step S101, the current value applied to the solenoid 37 is set to a predetermined constant value, and the solenoid 37 is turned ON. Then, at step S102, an actual stroke time of the solenoid 37 over the predetermined distance is measured, and the measured stroke time is compared to a reference period of time. If the measured stroke time is longer than the reference period of time so that the answer of step S102 is YES, the control system determines at step S103 that the temperature of the lubrication oil is extremely low, and the routine is returned. By contrast, if the measured stroke time is shorter than the reference period of time so that the answer of step S102 is NO, the control system determines at step S104 that the temperature of the lubrication oil is not extremely low, and the routine is returned. In the subroutine shown in FIG. 4, alternatively, a rotational angle of the selector plate 32 may also be used in the determination at step S102 instead of the stroke distance of the solenoid 37. Here, the rotational angle of the selector plate 32 and the stroke distance of the solenoid 37 may be detected by the stroke sensor 39, and the stroke time may be measured by an existing timer or by counting clock pulse of the ECU 18. Thus, not only the required time to rotate the selector plate 32 at the predetermined angle but also the required time to move the solenoid 37 over the predetermined distance may be compared to the reference period of time to determine the temperature of the lubrication oil 40. In addition, the activation force of the solenoid 37 as an actuator may be detected by detecting the current value applied thereto.

Figure 5:
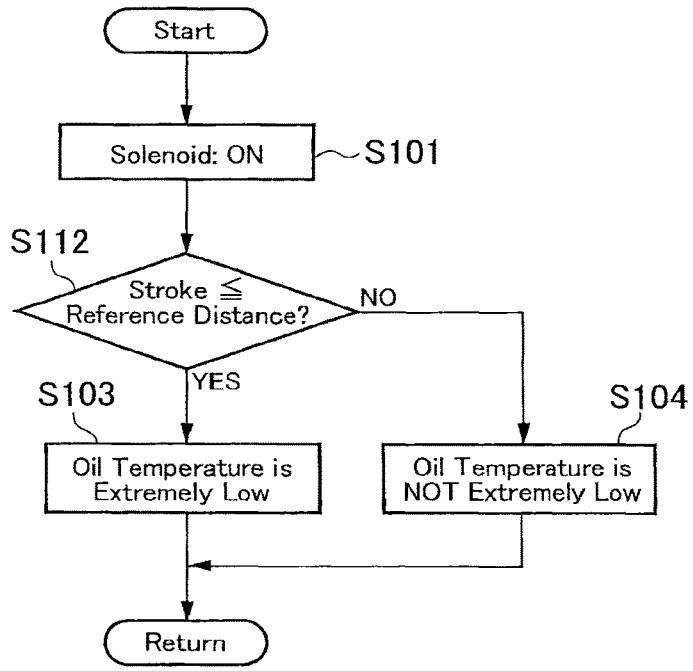
FIG. 5 is a flowchart showing a second example of a subroutine to determine an extremely low oil temperature.

Turning to FIG. 5, there is shown a second example of the subroutine to determine an extremely low temperature of the lubrication oil 40 based on a stroke distance of the solenoid 37 or a rotational angle of the selector plate 32. According to the second example of the subroutine, specifically, the stroke distance of the solenoid 37 or the rotational angle of the selector plate 32 within a predetermined period of time is measured while keeping a current value applied to the solenoid 37 to a constant value, and the measured value is compared at step S112 to a reference distance or angle. The remaining steps are similar to those of the subroutine shown in FIG. 4. If the measured value of the stroke distance of the solenoid 37 or the rotational angle of the selector plate 32 within the predetermined period of time is shorter than or narrower than the reference distance or angle so that the answer of step S112 is YES, the control system determines at step S103 that the temperature of the lubrication oil is extremely low, and the routine is returned. By contrast, if the measured value of the stroke distance of the solenoid 37 or the rotational angle of the selector plate 32 within the predetermined period of time is longer than or wider than the reference distance or angle so that the answer of step S112 is NO, the control system determines at step S104 that the temperature of the lubrication oil is not extremely low, and the routine is returned.

Figure 6:
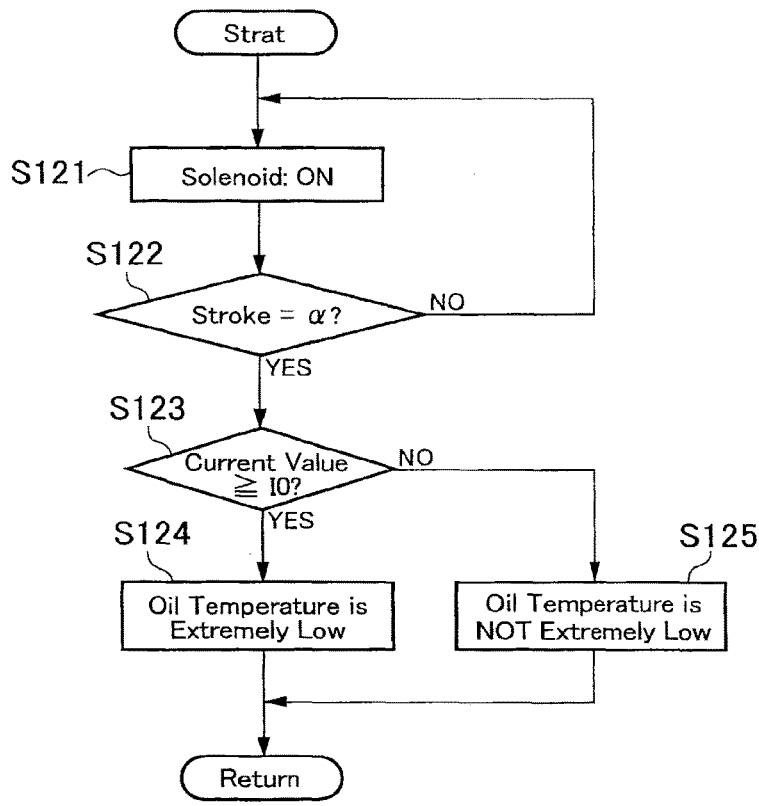
FIG. 6 is a flowchart showing a third example of a subroutine to determine an extremely low oil temperature.

Turning to FIG. 6, there is shown a third example of the subroutine to determine an extremely low temperature of the lubrication oil 40 based on the current value applied to the solenoid 37 to move the solenoid 37 over a predetermined distance or to rotate selector plate 32 at a predetermined rotational angle. According to the third example of the subroutine, at step S121, the solenoid 37 is turned on, and the current applied thereto in increased gradually. Then, at step S122, it is determined whether or not the stroke distance of the solenoid 37 or the rotational angle of the selector plate 32 reaches a predetermined value a. If the stroke distance of the solenoid 37 or the rotational angle of the selector plate 32 has not yet reached the predetermined value a so that the answer of step S122 is NO, the routine returns to step S121 to further increase the current applied to the solenoid 37. By contrast, if the stroke distance of the solenoid 37 or the rotational angle of the selector plate 32 has reached the predetermined value a so that the answer of step S122 is YES, the routine progresses to step S123 to determine whether or not the current value applied to the solenoid 37 is equal to or greater than a reference value I0. If the current value is equal to or greater than a reference value I0, this means that the drag torque resulting from an increase in viscosity of the lubrication oil 40 is unacceptably large. In this case, therefore, the control system determines at step S124 that the temperature of the lubrication oil is extremely low, and the routine is returned. By contrast, if the current value is smaller than the reference value I0 so that the answer of step S123 is NO, the control system determines at step S125 that the temperature of the lubrication oil is not extremely low, and the routine is returned.

Figure 7:
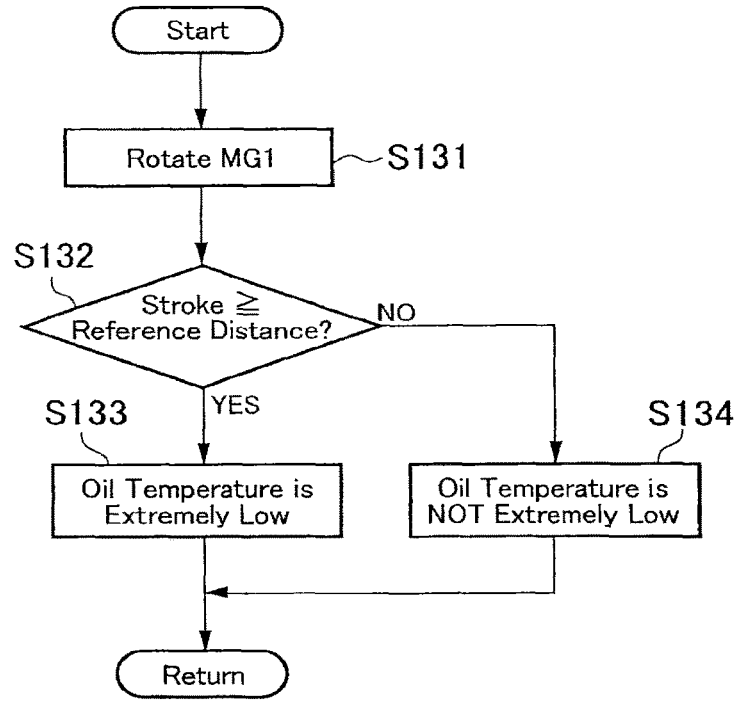
FIG. 7 is a flowchart showing a fourth example of a subroutine to determine an extremely low oil temperature.

Turning to FIG. 7, there is shown a fourth example of the subroutine to determine an extremely low temperature of the lubrication oil 40 based on a rotation or a travelling distance of the selector plate 32 by the drag torque. According to the fourth example of the subroutine, at step S131, the first motor 2 is rotated in the forward direction. As described, the forward direction is the direction to rotate the crankshaft of the engine 1 to start the engine 1 of the hybrid vehicle shown in FIG. 15 or 17, and if the first motor 2 is rotated in the forward direction, the selector plate 32 is subjected to a drag torque in the direction to be moved or rotated toward the engagement position where the SOWC 17 is brought into engagement mode. Then, the stroke distance of the solenoid 37 or the rotational angle of the selector plate 32 is compared at step S132 to the reference distance or angle. If the measured value of the stroke distance of the solenoid 37 or the rotational angle of the selector plate 32 is longer than or wider than the reference distance or angle so that the answer of step S132 is YES, this means that the viscosity of the lubrication oil 40 is unacceptably large. In this case, therefore, the control system determines at step S133 that the temperature of the lubrication oil is extremely low, and the routine is returned. By contrast, if the measured value of the stroke distance of the solenoid 37 or the rotational angle of the selector plate 32 is shorter than or narrower than the reference distance or angle so that the answer of step S132 is NO, the control system determines at step S134 that the temperature of the lubrication oil is not extremely low, and the routine is returned.

Turning back to FIG. 1, if the control system determines a fact that the temperature of the lubrication oil 40 is extremely low by any of the foregoing procedures, a starting method of the engine 1 is selected at step S2. As explained later, according to the preferred embodiment, a warm-up of the engine 1 is executed electrically if the temperature of the lubrication oil 40 is extremely low. Such electrical warm-up of the engine 1 may be carried out if an SOC (i.e., a state of charge) level of the battery is sufficient, and the control system functions properly. At step S2, the control system selects an appropriate starting method of the engine 1 out of the following methods based on such requisite conditions.

Then, at step S3, it is determined whether or not the starting method of the engine 1 selected at step S2 is a cold starting method. If the cold starting method was not selected so that the answer of step S3 is NO, the routine is returned.

By contrast, if the cold starting method was selected so that the answer of step S3 is YES, the routine progresses to step S4 to start the engine 1 under the condition that the temperature of the lubrication oil 40 is extremely low. Specifically, the temperature of the lubrication oil 40 is raised prior to carry out a cranking of the engine 1 by the first motor 2. For example, the lubrication oil 40 in an oil pan and an oil passage may be heated by a heater (not shown) for a predetermined period of time.

Figure 8:
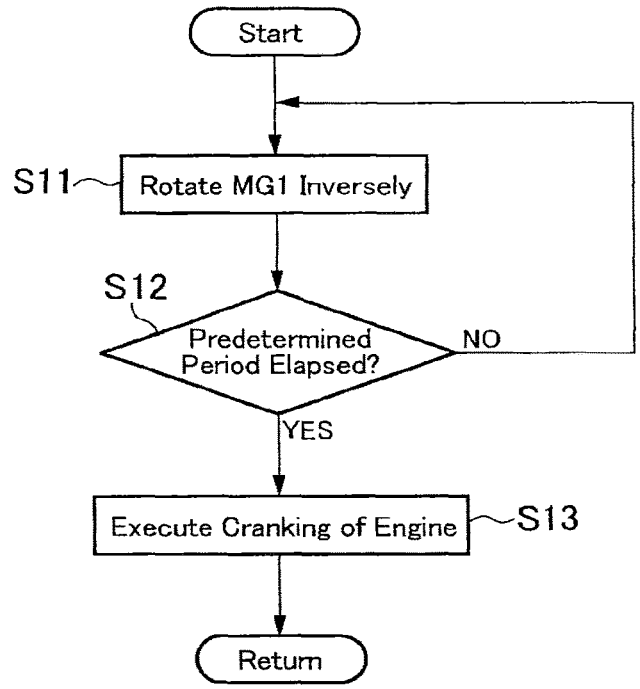
FIG. 8 is a flowchart showing one example a subroutine to start the engine after warming the lubrication oil.

Alternatively, the temperature of the lubrication oil 40 may also be raised by agitating the lubrication oil 40. An example of a subroutine for raising the temperature of the lubrication oil 40 by agitating the lubrication oil 40 is shown in FIG. 8. First of all, the first motor 2 is rotated in the backward direction at step S11. As described, the backward direction is the rotational direction opposite to the forward direction, and even if the SOWC 17 is in the engagement mode when rotating the first motor 2 in the backward direction, the SOWC 17 is brought into the overrunning mode without transmitting torque. In the nomographic diagram shown in FIG. 9, the line L1 indicates changes in speeds of the rotary elements of the power distribution device 4 and the overdrive device 19 during execution of the subroutine shown in FIG. 8. In the situation in which the subroutine shown in FIG. 8 is executed, the hybrid vehicle is stopped and hence the ring gear 7 the power distribution device 4 is not rotated. In this situation, when the sun gears 5 and 20 are rotated in the backward direction together with the first motor 2, the ring gear 22 of the overdrive device 19 is also rotated in the backward direction. That is, the ring gear 22 is rotated in the direction to rotate the selector plate 32 toward the disengagement position at which the SOWC 17 is brought into the overrunning mode. For this reason, the SOWC 17 will not be brought into engagement mode undesirably even if the selector plate 32 is subjected to the drag torque resulting from an increase in viscosity of the lubrication oil 40. In the situation indicated by the line L1, since the engine 1 is rotated in the backward direction, it is preferable to arrange a clutch between the output shaft of the engine 1 and the carriers 6 and 20, and to disconnect the engine 1 from the power distribution device 4 and the overdrive device 9 by releasing the clutch.

Figure 9:
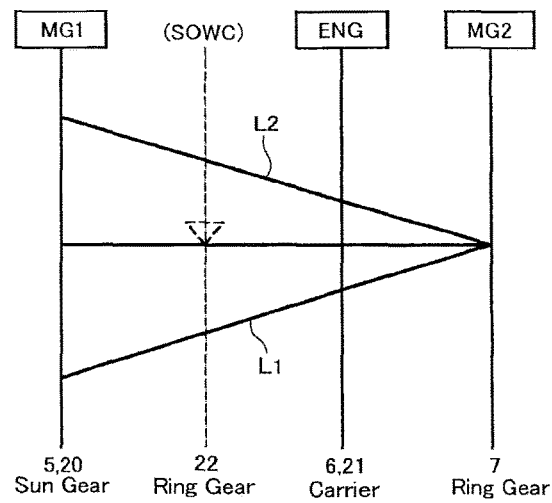
FIG. 9 is a nomographic diagram indicating changes in speeds of the rotary elements of the combined planetary gear unit during execution of the control shown in FIG. 8.

Consequently, at step S11 of FIG. 8, the notch plate 31 of the SOWC 17 is rotated in the backward direction, and the lubrication oil 40 is agitated while being subjected to a shearing force and a frictional force. As a result, a kinetic energy rotating the notch plate 31 is converted into a thermal energy so that the lubrication oil 40 is heated. Then, at step S12, it is determined whether or not a heating period of the lubrication oil 40 has exceeded a predetermined period of time, that is, it is determined whether or not the predetermined period of time has elapsed since the first motor 2 was started to be rotated in the backward direction. A heat value to raise the temperature of the lubrication oil 40 is increased in proportion to an increase in a rotational speed of the notch plate 31 and a duration time to rotate the notch plate 31, and viscosity of the lubrication oil 40 is reduced with a temperature rise thereof. Accordingly, a length of time to heat the lubrication oil 40 until the drag torque acting on the selector plate 32 is reduced sufficiently, that is, the predetermined period of time used in the determination at step S12 can be determined in advance based on a result of experimentation. If the heating period of the lubrication oil 40 has not yet exceeded the predetermined period of time so that the answer of step S12 is NO, this means that the lubrication oil 40 has not yet heated sufficiently and hence the viscosity thereof is still high. In this case, therefore, the routine returns to step S11 to continue the backward rotation of the first motor 2. By contrast, if the heating period of the lubrication oil 40 has already exceeded the predetermined period of time so that the answer of step S12 is YES, the selector plate 32 will not be rotated toward the engagement position by the drag torque even if the notch plate 31 is rotated in the forward direction. In this case, therefore, the routine progresses to step S13 to start a cranking of the engine 1. The situation during the cranking of the engine 1 is indicated in FIG. 9 by the line L2. In this situation, the solenoid 37 is inactivated and hence the selector plate 32 is held by the return spring 38 at the disengagement position. That is, the SOWC 17 will not be brought into the engagement mode and hence the first motor 2 is allowed to be rotated in the forward direction to start the engine 1. Thus, the cranking of the engine 1 is started when the duration time to rotate the first motor 2 in the backward direction reaches the predetermined period of time. Instead, the cranking of the engine 1 may also be started when the temperature of the lubrication oil 40 being raised reaches a predetermined level.

Figure 10:
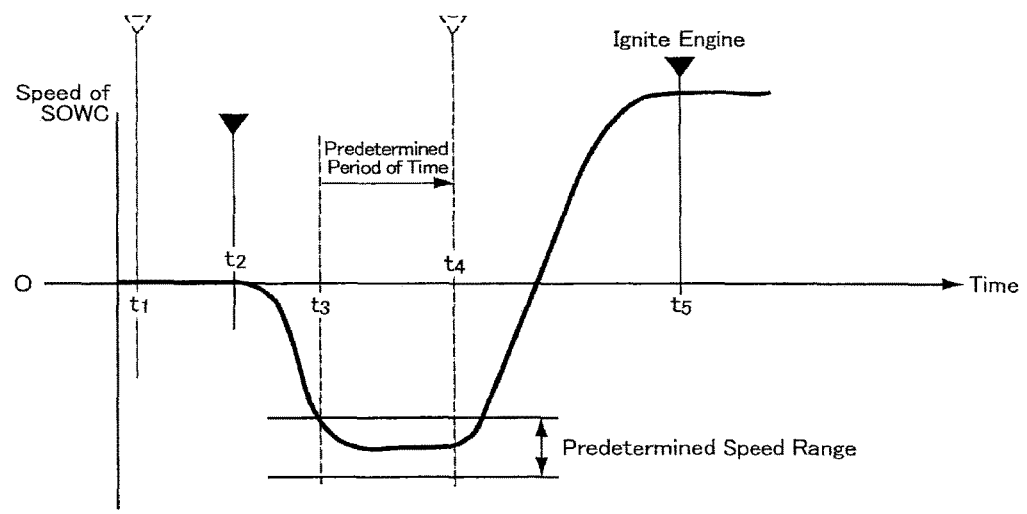
FIG. 10 is a time chart indicating a temporal change in a rotational speed of the notch plate of the selectable one-way clutch during execution of the control shown in FIG. 8.
Figure 11:
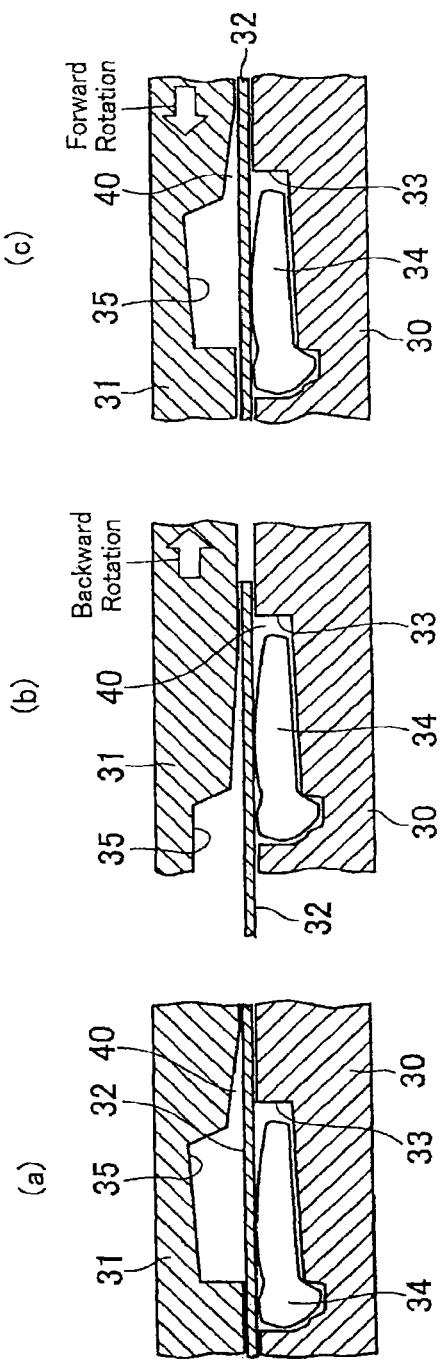
FIG. 11 is a schematic illustration showing an action of the selectable one-way clutch during execution of the control shown in FIG. 8.

Turning to FIG. 10, there is shown a temporal change in a rotational speed of the notch plate 31 of the SOWC 17 during execution of the control shown in FIG. 8. In FIG. 10, point t1 is a point at which the determination to carry out the cold start of the engine 1 is made at step 3 of the routine shown in FIG. 1, and cranking of the engine 1 is started at point t2. In this situation, as illustrated in FIG. 11 (a), the selector plate 32 of the SOWC 17 is moved to the disengagement position so that the strut 34 is pushed into the pocket 33 of the pocket plate 30.

In this situation, since the control system determines a fact that the temperature of the lubrication oil 40 is extremely low, the first motor 2 is rotated in the backward direction, and consequently the notch plate 31 is rotated in the backward direction. When the rotational speed of the notch plate 31 enters into a predetermined speed range at point t3, the rotational speed of the first motor 3 (that is, the rotational speed of the notch plate 31) is maintained within the predetermined speed range. As described, the notch plate 31 is rotated in the backward direction to heat the lubrication oil 40. To this end, the predetermined speed range is set in such a manner that the temperature of the lubrication oil 40 can be raised to a target temperature within the above-mentioned predetermined period of time. In this situation, the selector plate of the SOWC 17 is situated at a position shown in FIG. 11 (b).

At point t4, the control system determines a fact that the heating period of the lubrication oil 40 has exceeded the predetermined period of time at step S12 of the routine shown in FIG. 8. At point t4, therefore, the rotational speed of the first motor 2 is increased gradually in the forward direction to start the engine 1. When the rotational direction of the first motor 2 is switched from the backward direction the forward direction, the notch plate 31 is also rotated in the forward direction. In this situation, the selector plate 32 is subjected to the drag torque through the lubrication oil 40, however, the temperature of the lubrication oil 40 has already been raised to reduce the viscosity thereof. For this reason, the selector plate 32 can be prevented from being rotated by the drag torque. That is, the SOWC 17 will not be brought into the engagement mode undesirably as illustrated in FIG. 11 (c). Then, when the speed of the engine 1 reaches an ignition speed at point t5, the fuel is supplied to the engine 1 so that the engine 1 starts rotating autonomously.

As described, the temperature of the lubrication oil 40 is raised by a shearing force a frictional force, or an agitation force. In the SOWC 17, not only the notch plate 31 but also the selector plate 32 can be rotated relatively with respect to the fixed pocket plate 30. That is, the temperature of the lubrication oil 40 may also be raised by rotating the selector plate 32. Specifically, the selector plate 32 is allowed to rotate only between the engagement position and the disengagement position. In this case, therefore, the solenoid 37 is activated and inactivated repeatedly to reciprocate the selector plate 32.

Figure 12:
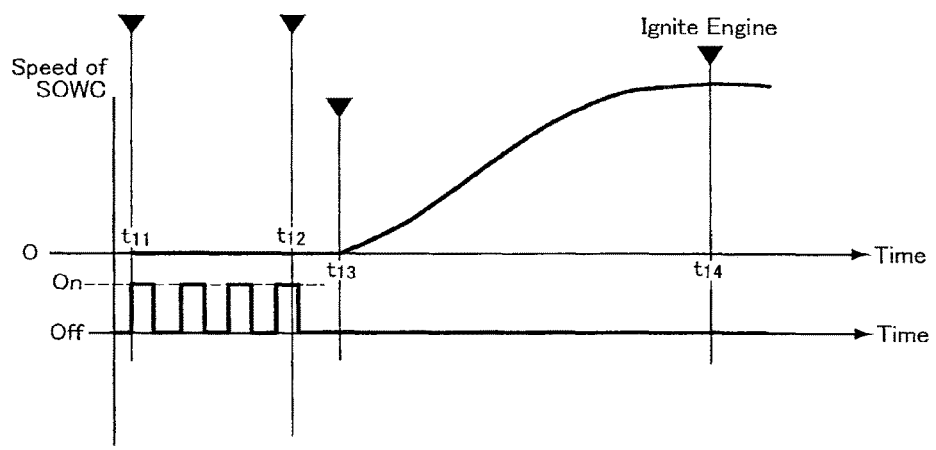
FIG. 12 is a time chart indicating temporal changes in a rotational speed of the notch plate of the selectable one-way clutch and an activation state of the solenoid during warning the oil by activating the solenoid repeatedly.

Turning to FIG. 12, there are shown temporal changes in a rotational speed of the notch plate 31 of the selectable one-way clutch 17 and an activation state of the solenoid 37 during warning the lubricating oil 40 by activating the solenoid repeatedly. At point t11, the determination to carry out the cold start of the engine 1 is made at step 3 of the routine shown in FIG. 1. In this case, the solenoid 37 is repeatedly activated and inactivated as represented by ON and OFF in FIG. 12. Consequently, the selector plate 32 is reciprocated repeatedly between the engagement position and the disengagement position by a pulling force of the solenoid 37 and a pushing force of the return spring 38. In this case, therefore, the temperature of the lubrication oil 40 is raised gradually by a shearing force a frictional force, or an agitation force.

When the predetermined period of time has elapsed since the solenoid 37 has been started to be activated and inactivated at point t12, the control system determines a fact that the heating period of the lubrication oil 40 has exceeded the predetermined period of time at step S12 of the routine shown in FIG. 8. In this case, the determination at step S12 may also be made based on a fact that a stroke time of the solenoid 37 is reduced to be shorter than a predetermined period of time, or a fact that a current value required to actuate the solenoid 37 is reduced to be smaller than a predetermined value.

Immediately after point t12, the solenoid 37 is inactivated and the cranking of the engine 1 by the first motor 2 is started at point t13. In this situation, a drag torque is generated in the direction to bring the SOWC 17 into the engagement mode. However, since the viscosity of the lubrication oil 40 has already been reduced to weaken the drag torque, the SOWC 17 will not be brought into the engagement mode. During cranking of the engine 1, the speed of the engine 1 is increased by the first motor 2, and when the speed of the engine 1 reaches an ignition speed at point t14, the fuel is supplied to the engine 1 so that the engine 1 starts rotating autonomously.

Turning back to FIG. 1, if the temperature of the lubrication oil 40 is not extremely low so that the answer of step S1 is NO, the routine progresses to step S5 to start the engine 1 by a normal procedure without warming the lubrication oil 40. In this case, the engine 1 is started immediately by the first motor 2 upon reception of a starting command.

Figure 13:
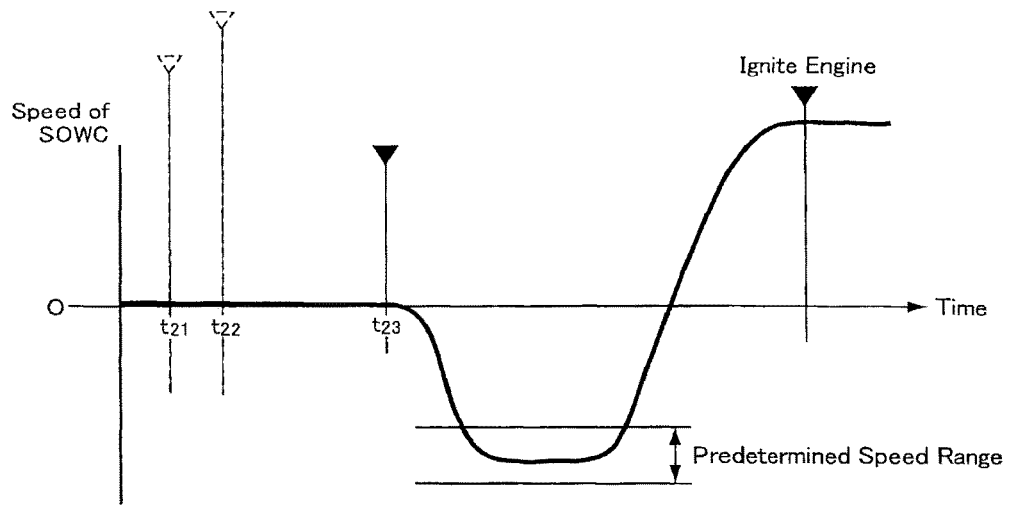
FIG. 13 is a time chart indicating a temporal change in a rotational speed of the notch plate of the selectable one-way clutch during starting the engine after the determination of extremely low oil temperature.

Turning to FIG. 13, there is shown a temporal change in a rotational speed of the notch plate 31 of the selectable one-way clutch 17 during starting the engine 1 in case the determination of extremely low temperature of the lubrication oil 40 has been made based on the fact that the stroke time of the solenoid 37 is longer than the reference period of time. When the engine 1 is commanded to be started at point t21, the solenoid 37 is activated at point t22. In this situation, an actual stroke time of the solenoid 37 over the predetermined distance (that is, a response time of the solenoid 37) is measured from the point t22 of activation of the solenoid 37. If the measured stroke time of the solenoid 37 is longer than the reference period of time, the control system determines a fact that the temperature of the lubrication oil 40 is extremely low, and the cold starting of the engine 1 is carried out. In this case, the first motor 2 is stopped until point t23 at which the cold start of the engine 1 is started, and rotated in the backward direction from point t23. The remaining changes in the rotational speeds of the first motor 2 and the SOWC 17 are similar to those in the example shown in FIG. 12.

Figure 14:
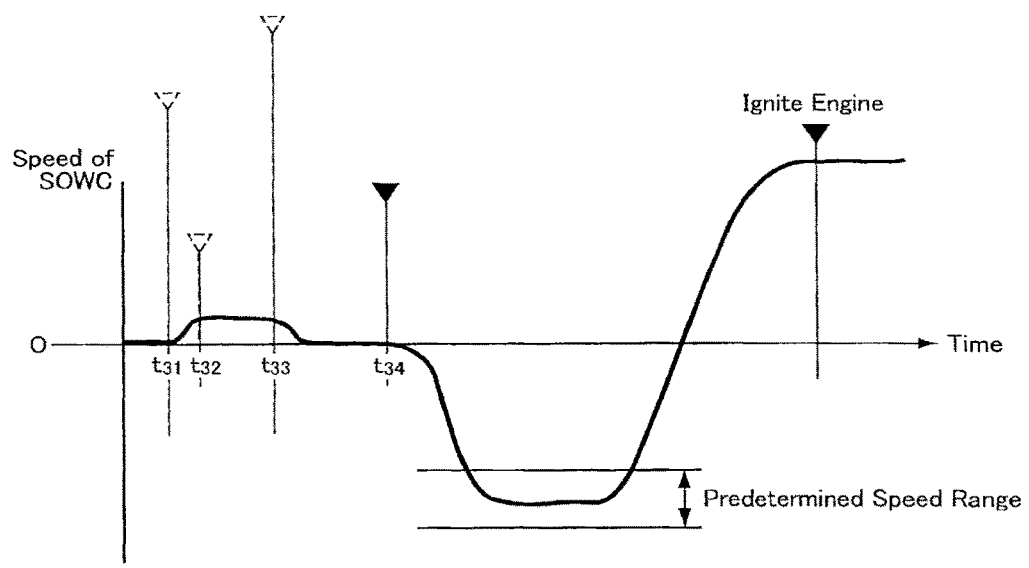
FIG. 14 is a time chart indicating a temporal change in a rotational speed of the notch plate of the selectable one-way clutch during starting the engine after the determination of extremely low oil temperature based on a fact that the selector plate is rotated by the notch plate.

Turning to FIG. 14, there is shown a temporal change in a rotational speed of the notch plate 31 of the selectable one-way clutch 17 during starting the engine 1 in case the determination of extremely low temperature of the lubrication oil 40 has been made based on the fact that the rotational angle of the selector plate 32 is wider than the reference angle. When the engine 1 is commanded to be started at point t31, the first motor 2 is rotated in the forward direction and consequently the notch plate 31 is rotated in the forward direction. In this situation, if the temperature of the lubrication oil 40 is low and hence the viscosity thereof is high, the selector plate 32 is rotated by the drag torque, and the rotational angle of the selector plate 32 is detected by the stroke sensor 38. If the measured value of the rotational angle of the selector plate 32 is wider than the reference angle, the control system determines a fact that the temperature of the lubrication oil 40 is extremely low. In this case, the forward rotation of the engine 1 is kept to a constant speed at point t32, and then the engine 1 is stopped. Consequently, the cold starting of the engine 1 is selected, at point t34, and the cold starting of the engine is carried out at point t34. The remaining changes in the rotational speeds of the first motor 2 and the SOWC 17 are similar to those in the example shown in FIGS. 12 and 13.

Although the above exemplary embodiment of the present application have been described, it will be understood by those skilled in the art that the present application should not be limited to the described exemplary embodiment, and various changes and modifications can be made within the spirit and scope of the present application. For example, the warming control of the lubrication oil may be executed during execution of the cranking of the engine irrespective of the temperature of the lubrication oil.

What is claimed is:

1. A control system for a hybrid vehicle that is applied to a hybrid vehicle comprising:
    an engine;
    at least one motor;
    a rotary member that is rotated in a predetermined direction during propulsion of the vehicle by a driving force generated by the engine and during cranking the engine by the motor; and
    a selectable one-way clutch that inhibits the rotary member from rotating in the predetermined direction in an engagement mode, and that allows the rotary member to rotate in the predetermined direction in an overrunning mode;
    wherein the selectable one-way clutch comprises a fixed member, a movable member that is connected to the rotary member, and a selector member that is disposed between the fixed member and the movable member and that is rotated in the predetermined direction to bring the selectable one-way clutch into the engagement mode by engaging the movable member with the fixed member;
    wherein the control system is configured
    to raise a temperature of lubrication oil when cranking the engine by the motor, and
    to rotate the rotary member in the predetermined direction by cranking the engine by the motor after raising the temperature of the lubrication oil while bringing the selectable one-way clutch into the overrunning mode.

2. The control system for a hybrid vehicle as claimed in claim 1, wherein the control system is further configured:
    to determine the temperature of the lubrication oil applied to the selectable one-way clutch when cranking the engine by the motor; and
    to raise the temperature of the lubrication oil if it determines that the temperature of the lubrication oil is low.

3. The control system for a hybrid vehicle as claimed in claim 2,
    wherein the selectable one-way clutch further comprises an actuator that rotates the selector member from a position at which the selectable one-way clutch is brought into the overrunning mode to a position at which the selectable one-way clutch is brought into the engagement mode, and
    wherein the control system is further configured to determine that the temperature of the lubrication oil is low, based on a fact that a stroke time of the actuator over a predetermined distance or a rotational time of the selector member at a predetermined rotational angle while applying a constant activation force to the actuator is longer than a reference period of time.

4. The control system for a hybrid vehicle as claimed in claim 2,
    wherein the selectable one-way clutch further comprises an actuator that rotates the selector member from a position at which the selectable one-way clutch is brought into the overrunning mode to a position at which the selectable one-way clutch is brought into the engagement mode, and
    wherein the control system is further configured to determine that the temperature of the lubrication oil is low, based on a fact that a stroke distance of the actuator or a rotational angle of the selector member while applying a constant activation force to the actuator within a predetermined period of time is shorter than or narrower than a reference distance or angle.

5. The control system for a hybrid vehicle as claimed in claim 2,
    wherein the selectable one-way clutch further comprises an actuator that rotates the selector member from a position at which the selectable one-way clutch is brought into the overrunning mode to a position at which the selectable one-way clutch is brought into the engagement mode, and
    wherein the control system is further configured to determine that the temperature of the lubrication oil is low, based on a fact that an activation force applied to the actuator to rotate the selector member at a predetermined angle is greater than a reference value.

6. The control system for a hybrid vehicle as claimed in claim 2, wherein the control system is further configured to determine that the temperature of the lubrication oil is low, based on a fact that a rotational angle of the selector member rotated by a drag torque resulting from a rotation of the movable member is wider than a reference angle.

7. The control system for a hybrid vehicle as claimed in claim 1, wherein the control system is further configured to raise the temperature of the lubrication oil by rotating the movable member in an opposite direction to the predetermined direction.

8. The control system for a hybrid vehicle as claimed in claim 1, wherein the control system is further configured to raise the temperature of the lubrication oil by reciprocating the selector member between a position at which the selectable one-way clutch is brought into the engagement mode and a position at which the selectable one-way clutch is brought into the overrunning mode.

* * * * *